United States Patent [19]

van Ginkel et al.

[11] 4,255,832
[45] Mar. 17, 1981

[54] DEVICE FOR HANDLING OBJECTS

[75] Inventors: Mannes van Ginkel; Jan Plug, both of Barneveld, Netherlands

[73] Assignee: Moba Holding Barneveld B.V., Barneveld, Netherlands

[21] Appl. No.: 964,349

[22] Filed: Nov. 28, 1978

[30] Foreign Application Priority Data

Dec. 9, 1977 [NL] Netherlands ................ 7713640

[51] Int. Cl.³ .............................................. A22C 21/00
[52] U.S. Cl. ............................................ 17/11; 53/529
[58] Field of Search ....................... 17/11, 49, 44.1; 53/529, 523

[56] References Cited

U.S. PATENT DOCUMENTS

| | | | |
|---|---|---|---|
| 3,817,167 | 6/1974 | Mosterd | 17/11 X |
| 3,864,787 | 2/1975 | Mosterd | 127/11 |
| 4,121,321 | 10/1978 | Mosterd | 17/11 |
| 4,150,374 | 4/1979 | Brook | 17/11 X |

Primary Examiner—Willie G. Abercrombie

[57] ABSTRACT

A device for handling objects such as poultry objects provided with an attaching means for receiving the objects and having one or a pair of feelers located in the region of the attaching means and movable between a first position wherein normal operation of the device is prevented and a second position wherein normal operation of the device is permitted, movement to the second position being caused by an object in the attaching means. The attaching means may include a pair of slots for receiving a pair of poultry knee-joints in which case the absense of either knee-joint from its respective slot will allow its respective feeler to move to its first position. The feelers are mounted on a subframe which is vertically movable on a main frame, the two frames being movable transversely along a track which includes guides for controlling the operation of the device.

9 Claims, 5 Drawing Figures

DEVICE FOR HANDLING OBJECTS

The invention relates to a device for handling objects, provided with an attaching means for receiving an object.

In many cases it is desired to have a device not activated or to have it carry out another working cycle, if the object is not present in the right way within the attaching member. The latter fact can induce an incorrect operation or a break downs.

The invention aims to provide a solution for these difficulties which on the one hand is extremely simple and on the other hand prevents work disturbances.

Therefore according to the invention a feeler is present which is movable between two positions in the region of the attaching means, which feeler, when an object is present in the attaching means is impeded by this object to take the first of the said two positions and which feeler further in the said first position prevents the normal activation of the device.

Herewith it is important, that the feeler can prevent the operation of the device if no object is present at all or if a certain part of the object is not at a certain location, wherewith this is the location where the feeler is in its said first position.

In principle the invention can be realized in many ways, for instance by having the feelers control electrical switches or activate blocking- or decoupling members. Also it is applicable to a non-movable device as well as to devices movable along a track. In the latter case an efficient embodiment of the invention is obtained by application to a device which is provided with a frame movable along a track, supporting a sub frame that is movable in a direction transverse to the track, by providing according to a further elaboration of the invention, that the feeler cooperates with blocking means (7) to prevent or not prevent movement of the sub frame with respect to the frame in dependence on the position of the feeler. This control of the movement of the sub frame provides the possibility of having the sub frame cooperating or not cooperating with control members for the sub frame or parts thereof, which control members are located along said track, so that it is possible to either carry out a normal operation cycle or a cycle which is adapted to the fact that the object was not positioned correctly in the attaching means.

With this embodiment wherein the feeler can block the sub frame with respect to the main frame, the further possibility exists of utilizing this blocking after removal of the object. This can lead to a simplification of the device as a whole.

In order to ensure that with the feeler in its first position, the feeler does not impede the correct operation of the object, it is provided, according to a further feature of the invention, that means are present which can move the feeler to the second position and after this allow it to move towards the first position, the feeler being mechanically biased in the direction towards the first position, such that if an object is received in the attaching means the movement towards the first position is not carried out and the device can be activated, but if the object is not received in the attaching means the movement towards the first position is allowed so that the feeler prevents the normal activation of the device.

An important application of the invention is the handling of poultry. Specially in the case that the poultry is suspended by means of its knee-joints to a hook the possibility occurs that no poultry at all is present or as a further undesired possibility that only one knee-joint has been suspended in the hook in the correct way. In the latter case the handling of the poultry can occur incorrectly and disturbances or break downs can occur in packing devices or the like.

Accordingly an embodiment of the invention for handling of poultry consists in that the attaching means is a double hook for the knee-joints of a poultry and in that two feelers, one for each hook part for a knee-joint, are present, which each can cooperate with a blocking means such that only if both feelers are in their second position is the normal operation of the device allowed.

This yields the advantage, that when the poultry hangs on one leg as well as when the device is lacking of a poultry, the handling device does not start its operation and that moreover dropping of an incorrectly suspended poultry can occur at a certain suitable location by using the fact that the feelers have been activated.

The invention described below with reference to the accompanying drawing, in which.

Figure 3:
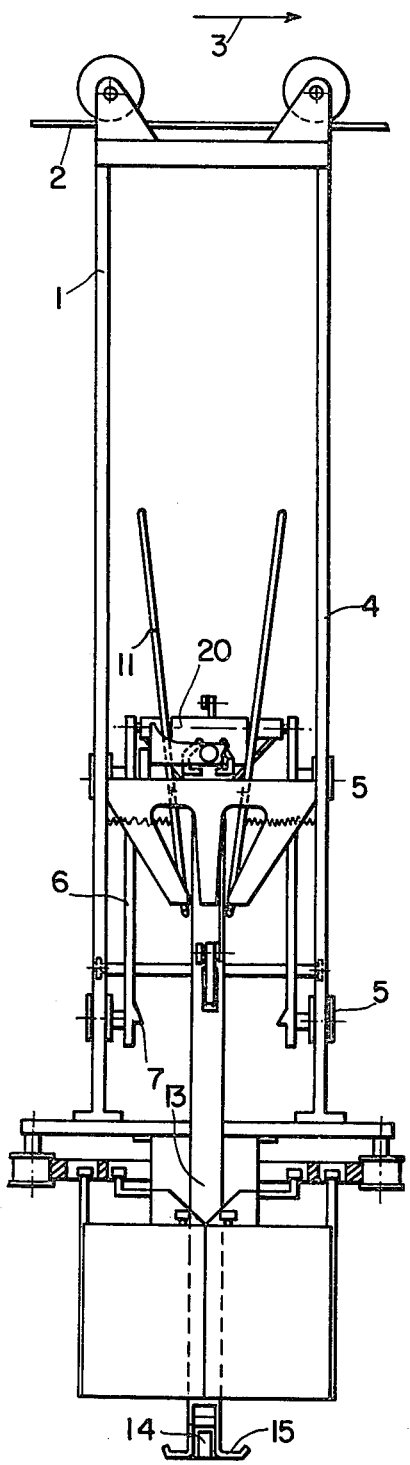
Figure 1:
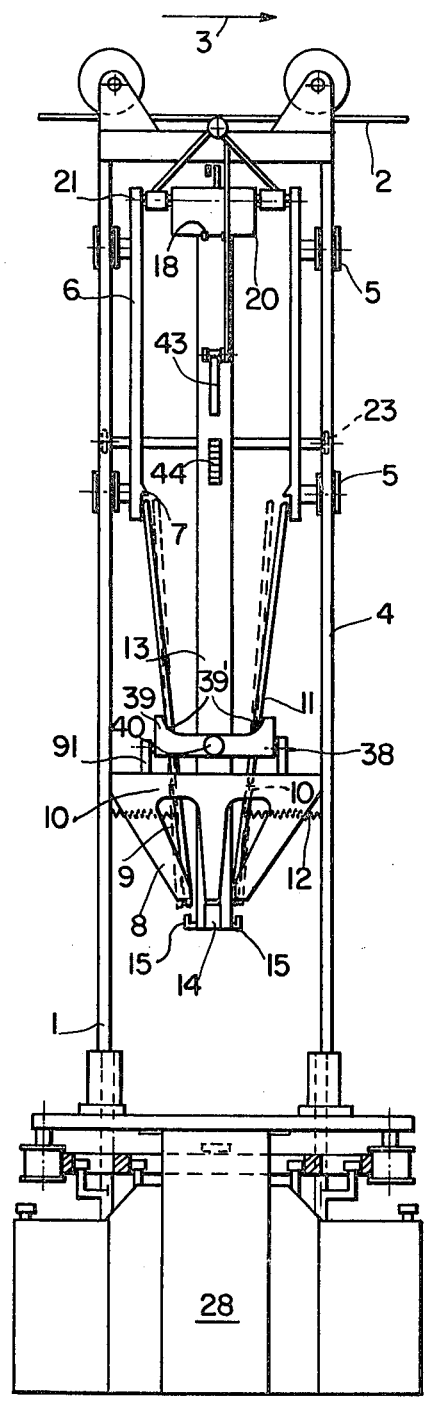
FIG. 1 is a front elevational view of an embodiment of the invention.
Figure 4:
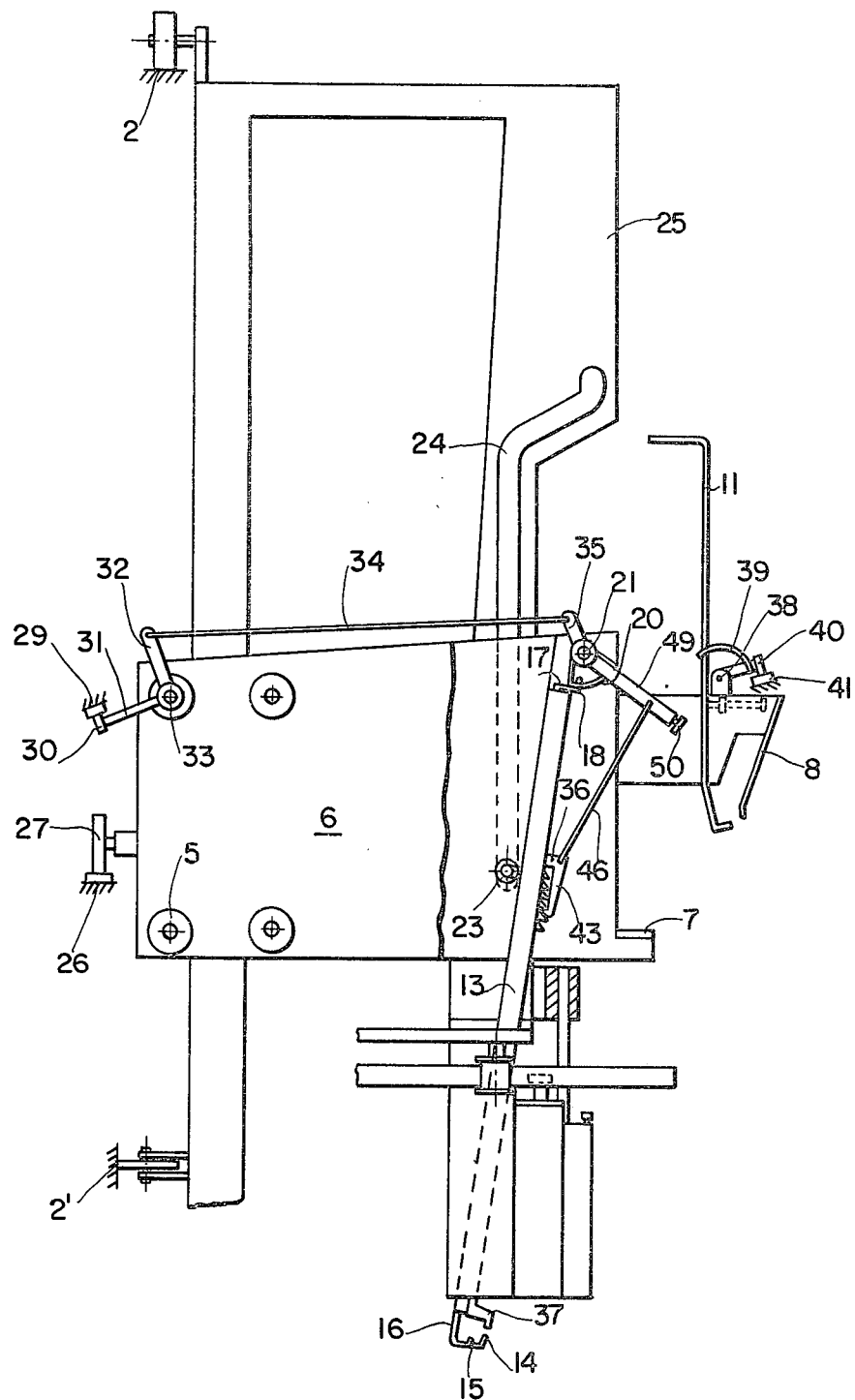

FIG. 3 correponds to FIG. 1 showing another operating position of the device;

FIG. 4 shows a side view of the device in the position of FIG. 3; and

Figure 5:
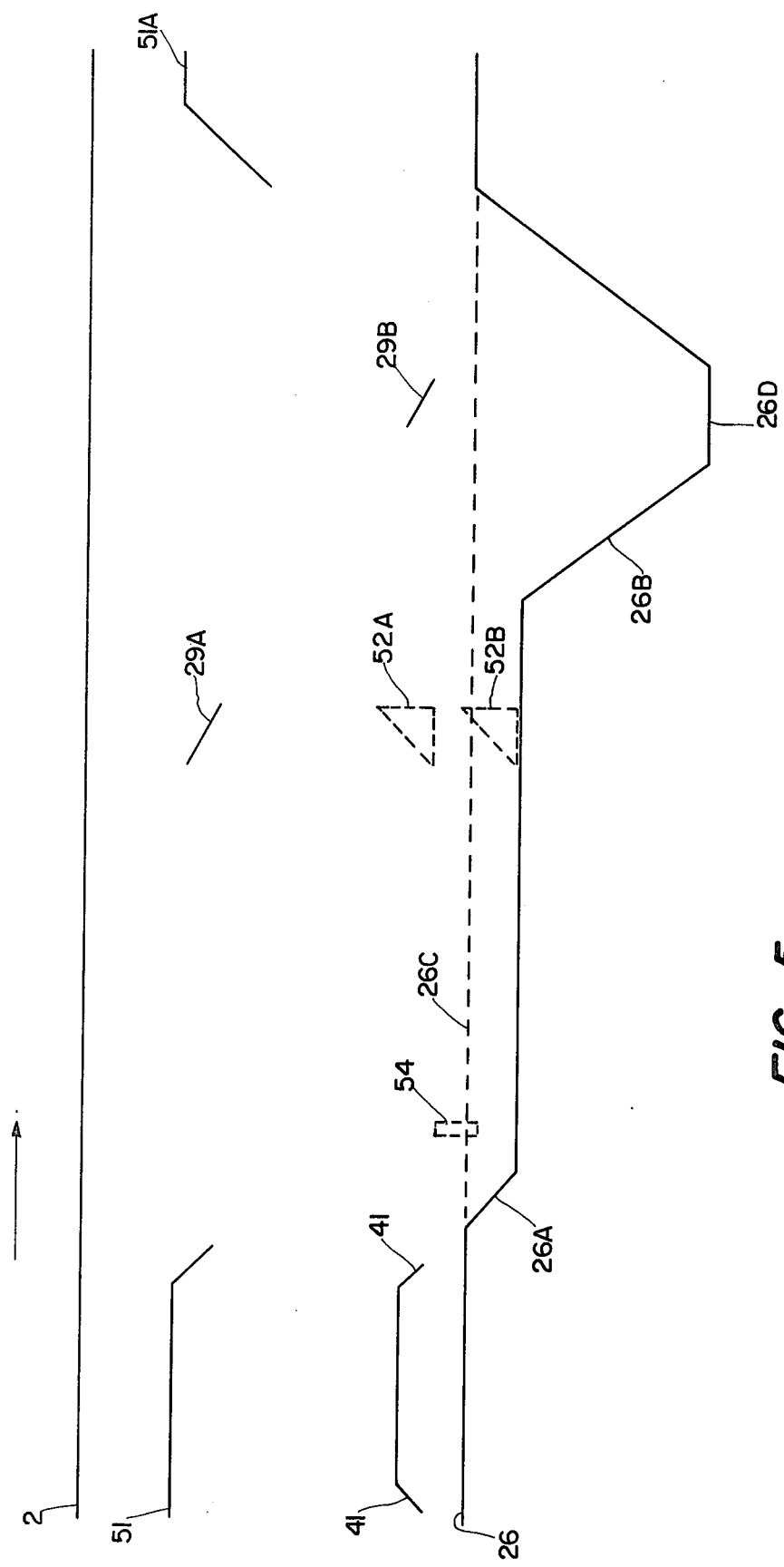

FIG. 5 shows a chart of control members along the track of the device.

In the drawing reference 1 indicates a frame, which by means of wheels can be moved along a track schematically indicated by 2 and 2' in the direction of the arrow 3.

The frame 1 is provided with vertical rails 4, along which by means of wheels 5 a sub frame 6 can move vertically.

The sub frame 6 is provided with abutments 7. A sheet 8 having slots 9 is mounted to the frame 1. Further the sheet 8 bears pivot pins the axes of which are shown at 10 on which feelers 11 are pivotably supported, which feelers by means of springs 12 are urged towards the position shown with solid lines, by reason of which they engage with their horizontally extending ends (see FIG. 2) the abutments 7 and prevent that the sub frame 6 from moving downwardly with respect to the frame 1. The sub frame 6 supports a bar 13, which at its lower end has a fixed finger 14 and two pivotable fingers 15 which together form a double hook for receiving the knee-joints of a poultry.

The pivotable fingers 15 are connected to bars which are pivotable about their longitudinal axis within the bar 13 and at their upper end are provided with arms 17 to the end of which sliding pins 18 are mounted, which protrude in control slots (not shown) in the plate segment 20, which is rotatable about a shaft 21 which is in turn supported by the sub frame 6. The bar 13 is pivotably mounted to sub frame 6. To the bar 13 further a follower roll 23 is mounted, which runs in a slot 24 which is formed in a sheet 25, which is fixedly connected to the frame 1.

The sub frame 6 is provided with a follower roll 27, which engages a control guide 26 mounted along the track 2.

Along the track 2 further a guide 29 is mounted under which a follower roll 30 runs, which is connected to an arm 31. This arms forms together with an arm 32 a hooked arm which is pivotable about a shaft 33. To the arm 32 a link 34 is connected, which at its other end is connected to an arm 35 which is fixedly connected to, the plate segment 20. When the guide 29 declines downwardly the hooked arm 31, 32 is rotated counter-clockwise, the link 34 is pulled towards the left and the plate segment 20 is rotated counter-clockwise, by reason of which the slide pins 18 is the non-shown control slits of this segment slide and the bars in bar 13 are rotated about their axes, so that the fingers 15 can pivot away from the fixed finger 14.

Further, a sheet 39 which is pivotable about a shaft 38 is provided, which plate 39 has inclined edge parts 39' and can be pivoted by means of a follower roll 40 and a guide 41.

Above the fingers 14, 15 which form a double hook a clamping member 37 is mounted, which via a rod within the bar 13 is connected to a member 36 to which a ratchet 43 is pivotably mounted. This ratchet can engage a rack 44 which is fixedly connected to the bar 13. Further, the ratchet is by means of a link 46 connected to a frame 49 which is pivotable about the shaft 21 and which supports a follower roll 50 which can cooperate with a guide 51 mounted along the track 2.

The operation of the above described device is described below with reference to FIG. 5, in which the different guides at their locations along the track 2 are indicated. For clarifying purposes of the several guides they are indicated with A or B as an index to indicate certain guide parts.

Figure 2:
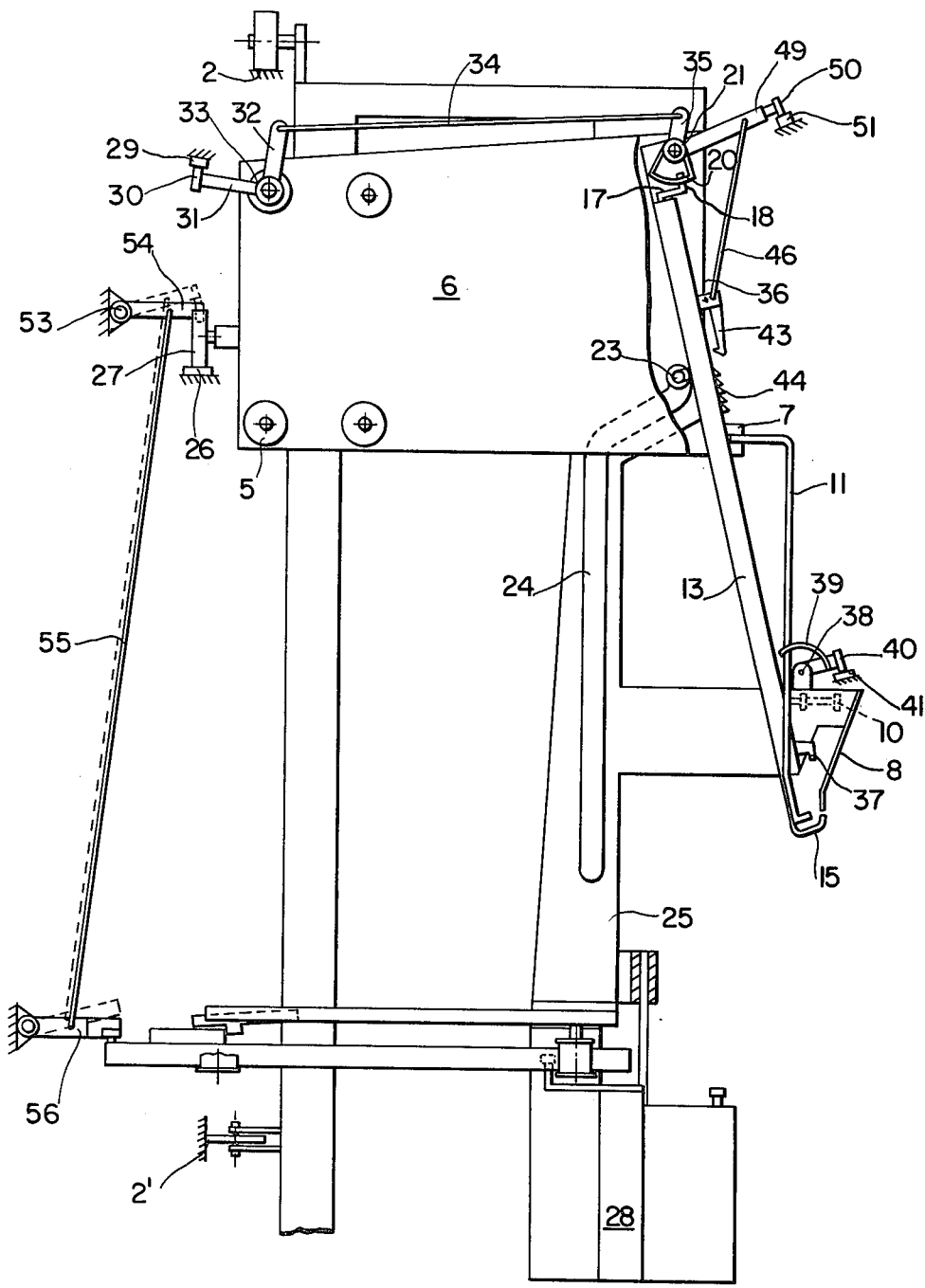
FIG. 2 is a side view of the device of FIG. 1.

At the beginning of the operation the guide 26 supports the sub frame 6, by means of follower roll 27 on the level shown in FIG. 1 and 2. Therewith the guide 51 causes the ratchet 43 to be in the position shown in FIG. 1 and 2 so that it cannot engage the rack 44.

Immediately at the beginning of the track 2 guide 41 rises somewhat. By reason of this the control plate 39 is pivoted via roll 40, so that the follower 11 assume the position shown in dotted lines FIG. 1. Following this the poultry is placed into the hooks formed by the fingers 14, 15 by inserting the legs through the recesses 9 in sheets 8 and moving them downwardly until they are in the hooks.

After this there is a part in which the guide 41 declines downwardly, so that it becomes possible for the feelers 11 to reach the position shown in FIG. 1 in solid lines when no knee-joint is present in the related hook 14, 15.

When none or only one knee-joint is present in the hook formed by the fingers 14, 15 either both feelers or one of the feelers will be in the position indicated in FIG. 1 with solid lines.

Following this the guide 26 has a downwardly declining part 26A. When the feelers 11 are in the position indicated with interrupted lines the normal working occurs and the sub frame 6 moves somewhat downwardly. If contrary to this at least one feeler is in the position indicated with solid lines, then the sub frame carries out a movement corresponding with the interrupted line 26C of FIG. 5.

The guide 29A has been applied at such a level, that in the latter case cooperation between this guide and the follow roll 30 occurs by reason of which via 31, 32, 34, 35, 20, 18, 17, and 15 the poultry is dropped.

Then the sub frame 6 remains at the level of the interrupted line 26C without having any poultry at the end of the working cycle when the follower roll 27 engages the guide 26 at the location at the right side of FIG. 5. where it has the same level as at the left side.

In accordance with the normal operation of the device the sub frame moves downwardly by reason of part 26B of guide 26 whereupon the poultry is brought into a schematically indicated modelling apparatus 28, whereas at the guide member 26D opening of the fingers 14, 15 occurs under influence of guide 29B.

Following this the part 51A of guide 51 becomes active and the ratchet 43 is pivoted away from the teeth of the rack 44 and moved upwardly towards its initial position.

In FIG. 5 an inclined cam member 52 has been indicated in two positions, to wit an inactive position 52A and an active position 52B. The activation of the member 52 to displace it from the inactive position 52A into the active position 52B can for instance be carried out by hand if for any reason a poultry suspended in the hook should not be normally handled, or automatically if for any reason normal handling of the poultry is not desired.

The cam member 52 has the advantage that the feelers 11 fulfil an additional function, because the sub frame is lifted by it to such a level, that the feelers 11 can locate themselves below the abutments 7, whereas the member 52 further lifts the sub frame efficiently to let it cooperate with the cam 29A for dropping any poultry present.

A further additional use of the feelers, which, when they are active define the level of the sub frame 6, is schematically indicated in FIG. 2.

If namely the sub frame 6 is supported by the feelers, the follower roll 27 will be at a level that differs from the level in which this follower roll 27 cooperates with the lowered parts of the guide 26, such as 26A, 26B, 26D. This has been utilized by letting the roll 27 lift an arm 54 which is pivotable at 53, which arm by means of a rod 55 is coupled to a control member 56 for a modelling apparatus 28, which not is further described, for instance for preventing this apparatus from becoming active, if the feelers support the sub frame 6. In FIG. 5 the location along the track 2, 2' of the arm 54 has been indicated.

What I claim is:

1. A device for handling objects comprising an attaching means for receiving the object, a feeler located in the region of the attaching means and being movable between a first position wherein normal operation of the device is prevented and a second position wherein normal operation of the device is permitted, said feeler being positioned to be in said second position and impeded from movemet to the first position by the presence of an object in the attaching means.

2. A device according to claim 1 provided with a frame movable along a track, which frame supports a sub frame movable in a direction transverse to the track, in which the feeler cooperates with blocking means to prevent or not prevent movement of the sub frame with respect to the frame in dependence on the position of the feeler.

3. A device according to claim 2, including means for moving the feeler to the second position and then allowing it to move towards the first position, the feeler being mechanically biased in the direction towards the first position, such that if an object is received in the attaching means the movement of the feeler towards the first position is prevented and the device can be normally activated, but if the object is not received in the attaching means the movement towards the first position is allowed so that the feeler prevents the normal activation of the device.

4. A device according to claim 1, for handling poultry, in which the attaching means is a sheet having a pair of slots for the knee-joints of a poultry and including a pair of feelers, one for each knee-joint slot, wherein each feeler can move to its first position to cooperate with a blocking means such that only if both feelers are in their second position can the normal operation of the device take place.

5. A device according to claim 2, including a pair of feelers and wherein the feelers are movably mounted in one of the frame and the sub frame and the blocking means are abutments supported by the other of the frames such that each feeler in the said first position is located in the path of relative movement of the abutment of its respective blocking means and is located outside of this path when it is in its second position.

6. A device according to claim 5, wherein said feelers are mounted in the sub frame and in which the sub frame is vertically movable with respect to the frame and is supported by a guide mounted along the frame, which guide has a downwardly declining part, such that when the feelers are located at the said downward declining part, downward movement of the sub frame is prevented.

7. A device according to claim 6, including a control guide for controlling an attachment means control member to release the contents of the attachment means, said control guide located at such a height with respect to said guide, that it can cooperate with the attachment means control member to cause the attachment means to release its contents when the feelers do not impede the relative movement of the frame and sub frame.

8. A device according to claim 6, including a control guide for controlling an attachment means control member to release the contents of the attachment means, said control guide located at such a height with respect to said guide, that it can cooperate with the attachment means control member to cause the attachment means to release its contents when the sub frame is at a level defined by cooperation of at least one feeler with its respective blocking means.

9. A device according to claim 8, including a movable inclined guide located before the further control guide, taken in the direction of movement of the frames, which inclined guide can be placed into the path of the follower member which is connected to the sub frame to lift the sub frame to a position at which the feelers can cooperate with the blocking means.

* * * * *